United States Patent [19]
Koch et al.

[11] Patent Number: 5,554,981
[45] Date of Patent: Sep. 10, 1996

[54] CAPACITIVE NUMBER WHEEL ENCODER FOR UTILITY METERS

[75] Inventors: Ronald N. Koch, Sewickley; Richard H. Koch, Zelienople, both of Pa.; Ray J. Thornborough, Menomonee, Wis.

[73] Assignee: Badger Meter, Inc., Milwaukee, Wis.

[21] Appl. No.: 298,641

[22] Filed: Aug. 31, 1994

[51] Int. Cl.$^6$ .................................................. G08C 19/10
[52] U.S. Cl. ........................... 340/870.37; 340/870.02; 73/509; 324/457; 324/458; 324/519
[58] Field of Search ................... 340/870.02, 870.03, 340/870.37; 73/517 R, 514, 509; 324/457, 458, 519, 660, 661, 114, 115

[56] References Cited

U.S. PATENT DOCUMENTS

| | | | |
|---|---|---|---|
| 3,534,619 | 10/1970 | Sutherland et al. | 74/84 |
| 3,543,259 | 11/1970 | Klyce | 340/200 |
| 3,609,726 | 9/1971 | Stewart, Jr. | 340/204 |
| 4,007,454 | 2/1977 | Cain et al. | 340/200 |
| 4,274,053 | 6/1981 | Ito et al. | 324/174 |
| 4,367,385 | 1/1983 | Frame | 200/159 |
| 4,429,308 | 1/1984 | Shankle | 340/870 |
| 4,433,577 | 2/1984 | Khurgin et al. | 73/290 |
| 4,437,098 | 3/1984 | Rosinek et al, | 340/870.02 |
| 4,471,450 | 9/1984 | Arnason et al. | 340/870.37 |
| 4,562,315 | 12/1985 | Aufderheide | 200/5 A |
| 4,562,430 | 12/1985 | Robinson | 340/870.37 |
| 4,779,094 | 10/1988 | Lee et al. | 340/870 |
| 4,851,385 | 7/1989 | Krumholz et al. | 340/870 |
| 4,868,566 | 9/1989 | Strobel et al. | 340/870 |
| 4,881,072 | 11/1989 | Carnel | 340/870 |
| 4,924,407 | 5/1990 | King et al. | 364/480 |
| 4,963,829 | 10/1990 | Wereb | 340/870.37 |
| 5,030,950 | 7/1991 | Veneruso | 364/566 |
| 5,136,286 | 8/1992 | Veneruso | 340/870.37 |
| 5,159,335 | 10/1992 | Veneruso | 340/870.37 |
| 5,172,039 | 12/1992 | Owens | 340/870.37 |

FOREIGN PATENT DOCUMENTS

| | | |
|---|---|---|
| 2816600A1 | 10/1979 | Germany . |
| 3310208A1 | 10/1984 | Germany . |
| PCT/US88/ 03911 | 11/1988 | WIPO . |

OTHER PUBLICATIONS

Flyer–"Capacitive Proximity Sensors", Rechner Electronics Industries, Inc.
Article "Endocer Employs Capacitance to Monitor Absolute Position", Engineering Materials and Design, Dec. 1988.
Article "New Capacitance Pressure Sensor Minimizes Thermal Effects", I&CS, Feb., 1992.

*Primary Examiner*—John K. Peng
*Assistant Examiner*—Ashok Mannava
*Attorney, Agent, or Firm*—Quarles & Brady

[57] ABSTRACT

A number wheel assembly (10) for a counter mechanism has a plurality of number wheels (13–18), each number wheel (13–18) having a sleeve (48) around its circumference with a plurality of positions representing successive increments in a count, a substrate (26–31) opposite one surface of the number wheel (13–18), the substrate (26–31) carrying an electrode (42) that is spaced from the number wheel (13–18) to form an air gap for a variable capacitor, and wherein the number wheel (13–18) carries at least one dielectric element (46) that is rotated with the number wheel (13–18) to vary the capacitance of the variable capacitor according to the position of the number wheel (13–18). Circuitry for detecting the capacitance and the position of the number wheels (13–18) is provided on a circuit board (39) that is electrically connected to the number wheels (13–18).

19 Claims, 6 Drawing Sheets

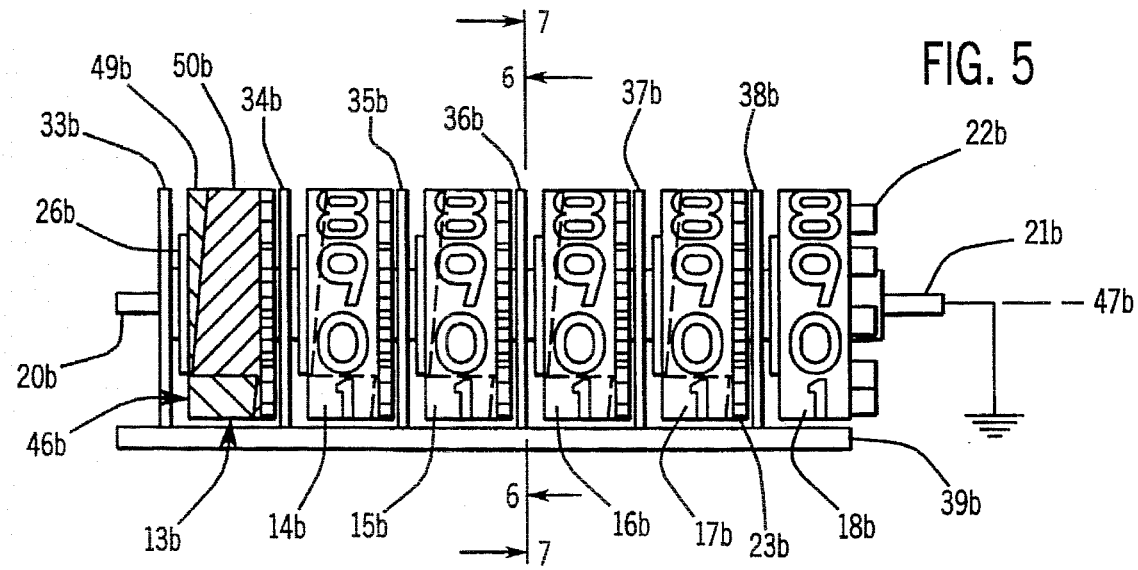
FIG. 5
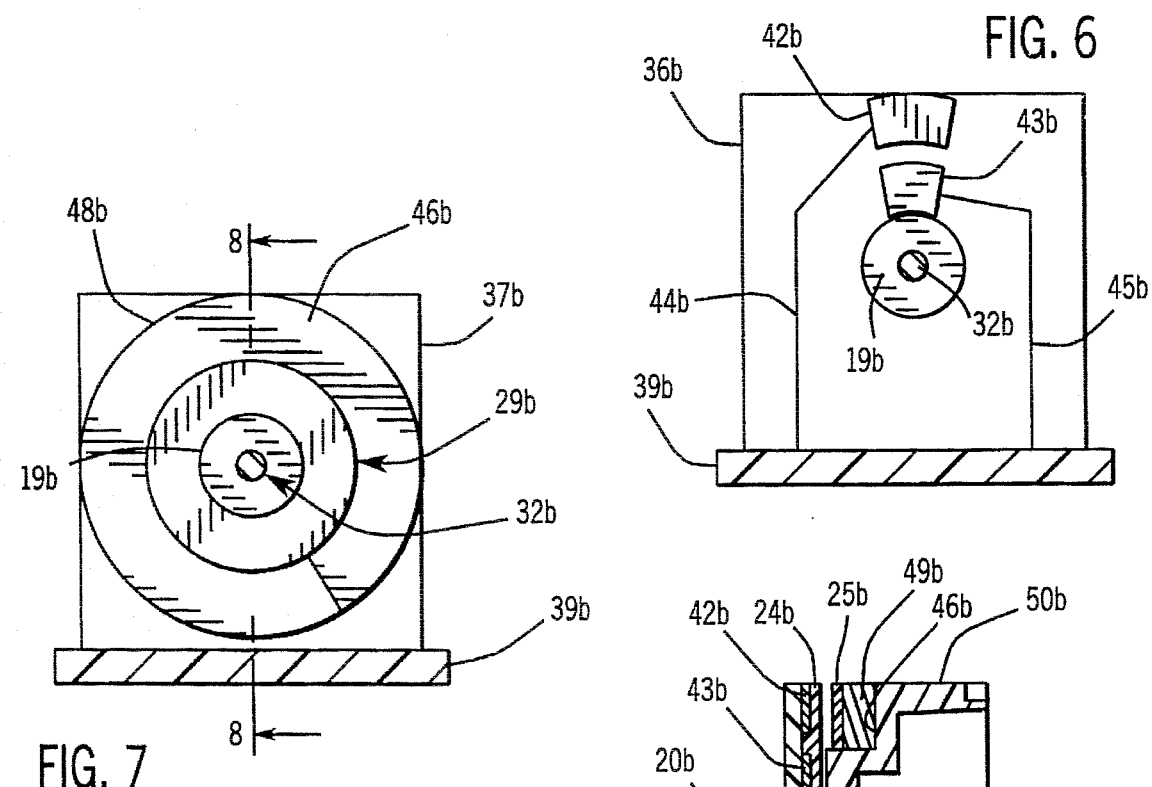
FIG. 6
FIG. 7
FIG. 8

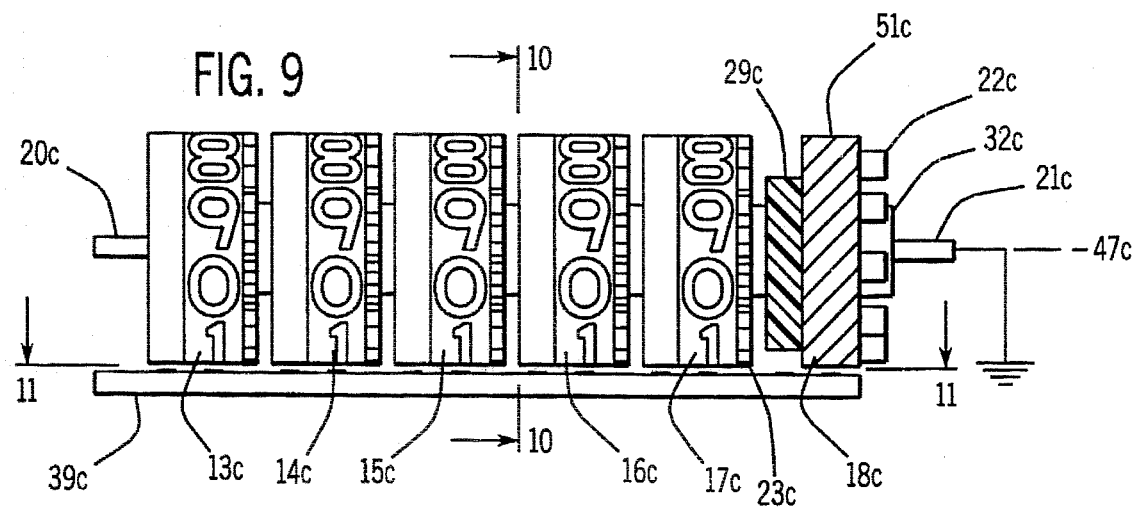
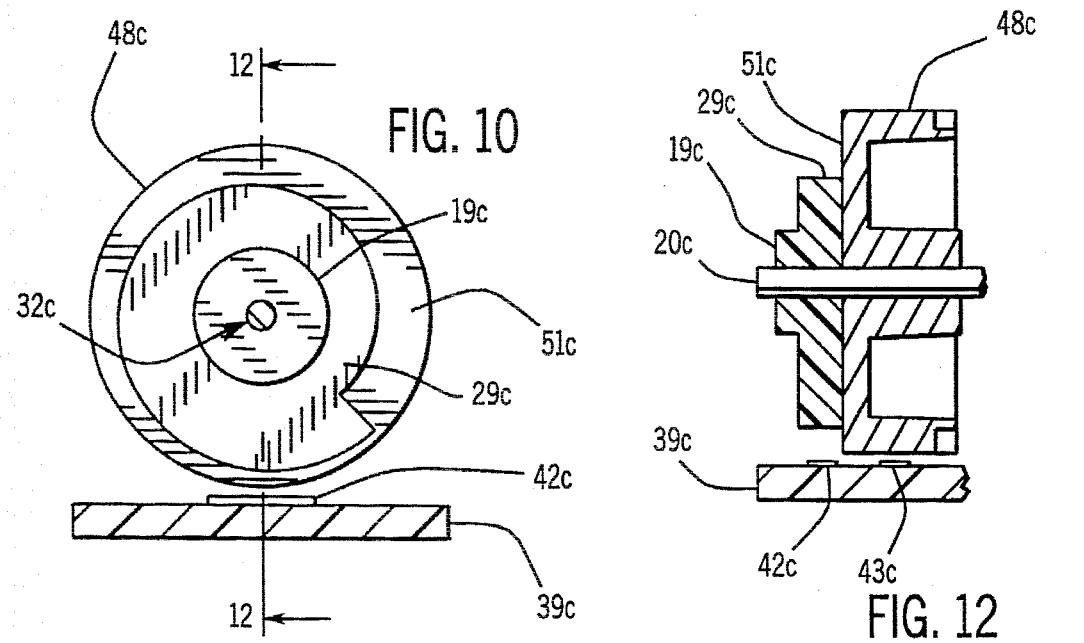
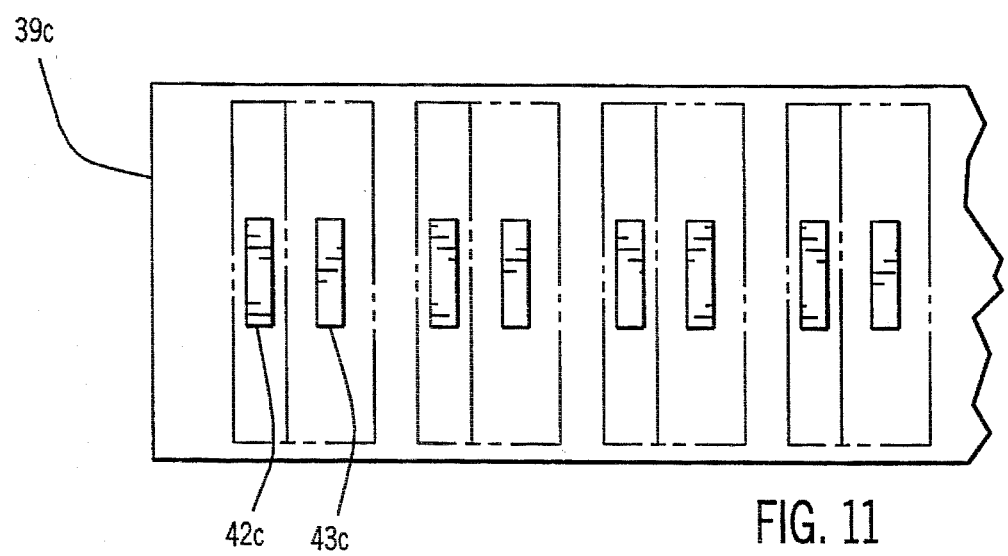

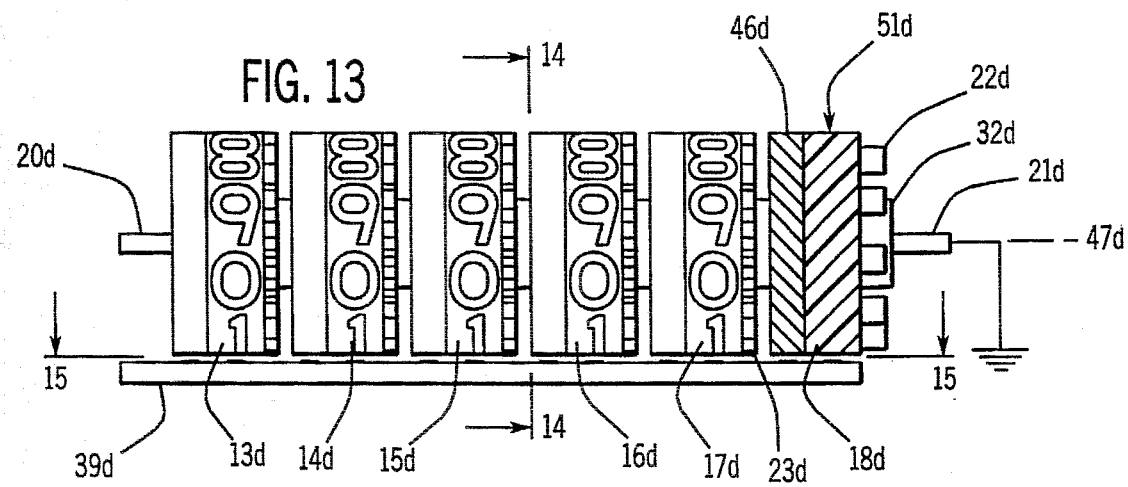
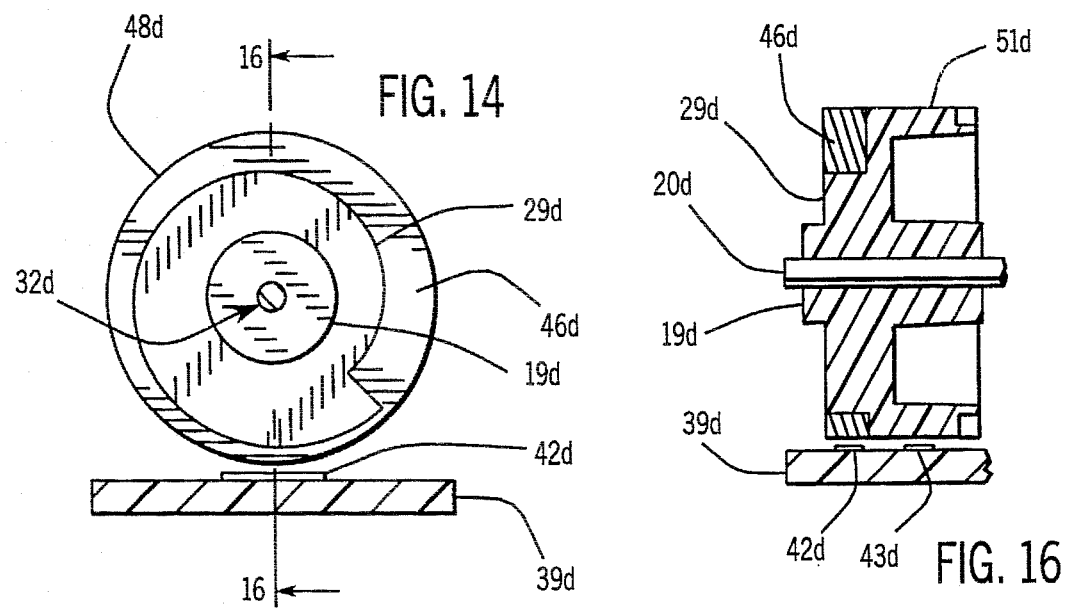
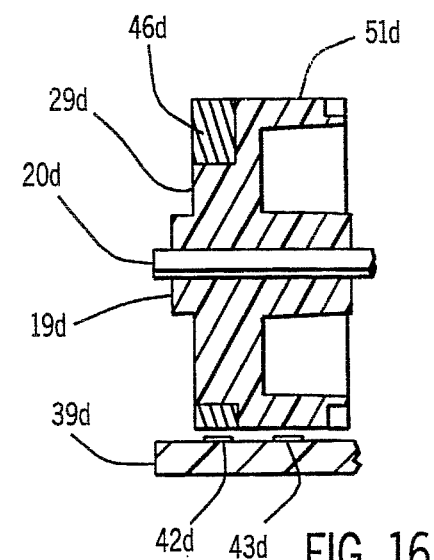
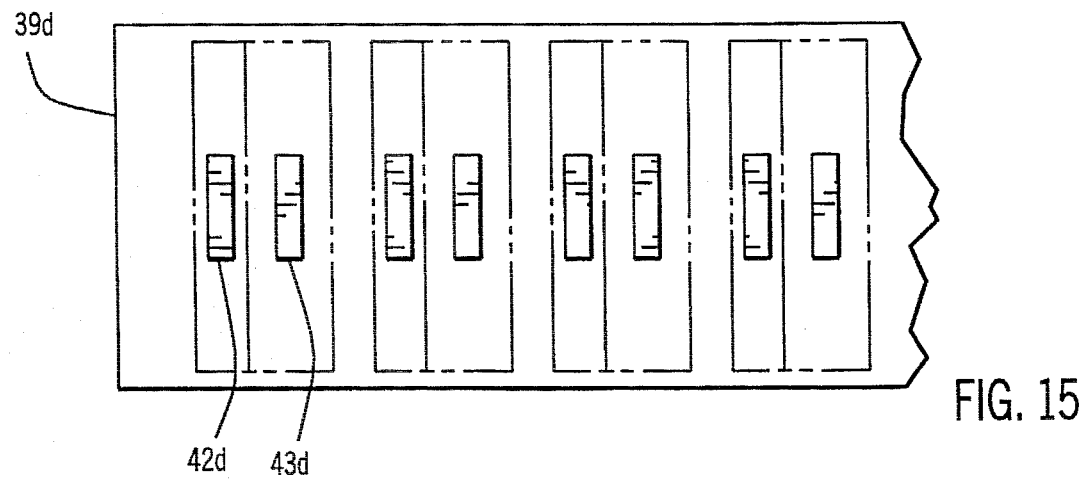

CAPACITIVE NUMBER WHEEL ENCODER FOR UTILITY METERS

TECHNICAL FIELD

The invention relates to meter registers for counting units of consumption in utility meters.

BACKGROUND ART

Registers for utility meters have typically used some form of digital counting device for recording units of consumption.

Klyce, U.S. Pat. No. 3,543,259 and King et al., U.S. Pat. No. 4,924,407, show capacitive-type meter reading devices. These devices are designed for use with dial-type meter registers.

Another type of meter register utilizes number wheels similar to odometers used in a wide variety of counting devices. This type of counting devices often use some type of contact system with contacts on the number wheel which contact a reference contact for detecting position. Such contact systems encounter the problems associated with contact systems in general, namely wear, shorting of contacts due to accumulated moisture and corrosion.

There is a need in the art of utility meters for non-contact encoder that is not subject to contact oxidation and wear.

SUMMARY OF THE INVENTION

The invention relates to an improved rotatable element assembly for use in a non-contact encoder in the register of a utility meter.

The present invention is directed to new and improved capacitive-type register mechanisms to be applied, in the first instance, to utility meters.

The device comprises at least one rotatable element having a circumference with a plurality of positions representing successive increments in a count, a substrate opposite one surface of the rotatable element, the substrate carrying an electrode that is spaced from the rotatable element to form an air gap for a variable capacitor, and wherein the rotatable element carries at least one dielectric element that is rotated with the rotatable element to vary the capacitance of the variable capacitor.

The capacitance can be varied by varying the spacing of the air gap between the dielectric element and the electrode on the substrate. The capacitance can also be varied by varying a thickness of the dielectric element opposite the electrode on the substrate.

The thickness of the dielectric element can be varied in a direction parallel to the axis of rotation of the rotatable element. The thickness of the dielectric element can also be varied in a direction along a radius from the axis of rotation of the rotatable element.

In some embodiments, the rotatable element carries a second dielectric element disposed adjacent said first-mentioned dielectric element and varying inversely in thickness to said first-mentioned dielectric element.

The thicknesses of the first and second dielectric elements can be varied in a direction parallel to the axis of rotation of the rotatable element. The thicknesses of the first and second dielectric elements can also be varied in a direction along a radius from the axis of rotation of the rotatable element.

In another embodiment, the rotatable element carries a plurality of dielectric elements in four tracks around its circumference to vary four capacitances and generate an analog-coded decimal pattern of capacitance signals.

The non-contact nature of the invention allows the option of providing thin coatings of sealing material on the electrodes and dielectric elements to protect against moisture.

Other objects and advantages, besides those discussed above, will be apparent to those of ordinary skill in the art from the description of the preferred embodiment which follows. In the description, reference is made to the accompanying drawings, which form a part hereof, and which illustrate examples of the invention. Such examples, however, are not exhaustive of the various embodiments of the invention, and, therefore, reference is made to the claims which follow the description for determining the scope of the invention.

BRIEF DESCRIPTION OF THE DRAWINGS

FIG. 5 is a side view in elevation of a second embodiment of the invention;

FIG. 6 is a sectional view taken in the plane indicated by line 6—6 in FIG. 5;

FIG. 7 is a sectional view taken in the plane indicated by line 7—7 in FIG. 5;

FIG. 8 is a sectional view taken in the plane indicated by line 8—8 in FIG. 7;

FIG. 9 is a side view in elevation of a third embodiment of the invention;

FIG. 10 is a sectional view taken in the plane indicated by line 10—10 in FIG. 9;

FIG. 11 is a sectional view taken in the plane indicated by line 11—11 in FIG. 9;

FIG. 12 is a sectional view taken in the plane indicated by line 12—12 in FIG. 10;

FIG. 13 is a side view in elevation of a fourth embodiment of the invention;

FIG. 14 is a sectional view taken in the plane indicated by line 14—14 in FIG. 13;

FIG. 15 is a sectional view taken in the plane indicated by line 15—15 in FIG. 13;

FIG. 16 is a sectional view taken in the plane indicated by line 16—16 in FIG. 14;

DETAILED DESCRIPTION OF THE PREFERRED EMBODIMENTS

Figure 1:
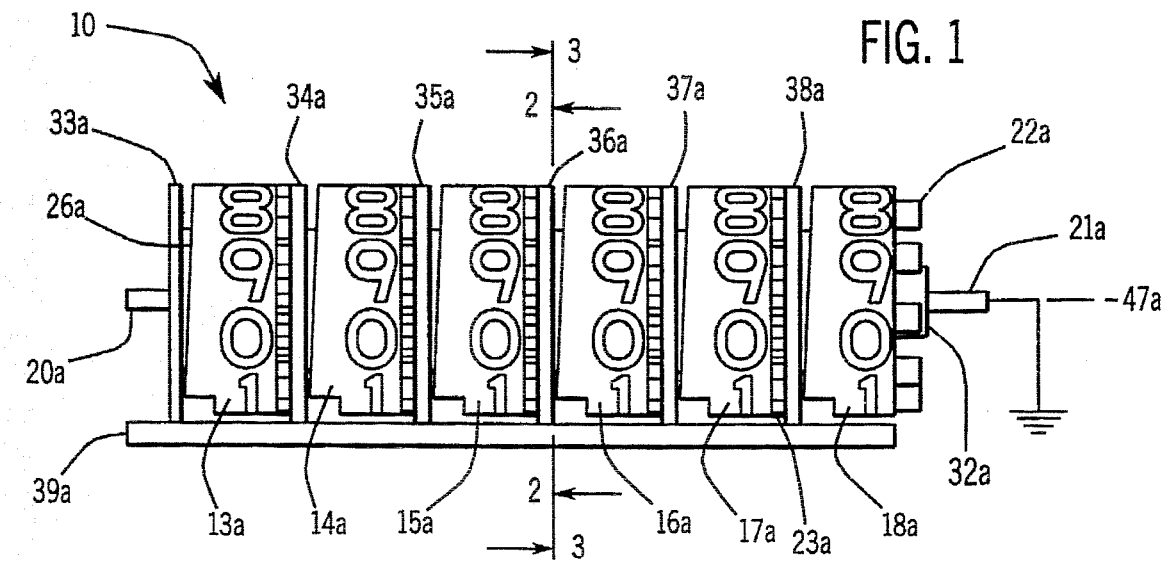
FIG. 1 is a side view in elevation of a first embodiment of the invention.
Figure 3:
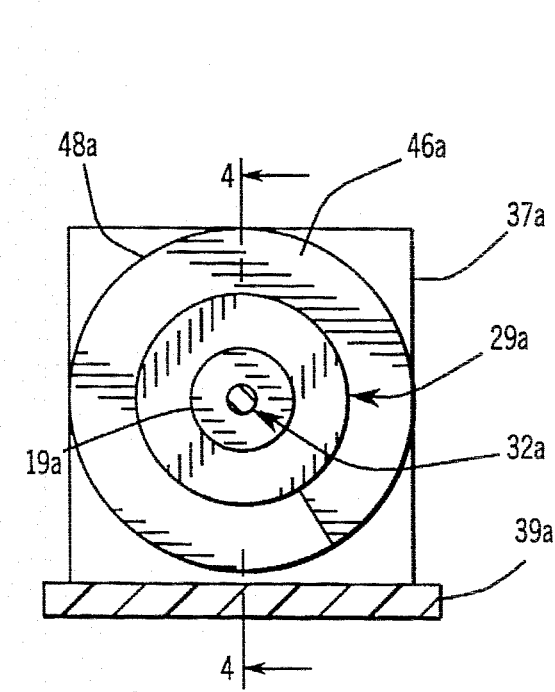
FIG. 3 is a sectional view taken in the plane indicated by line 3—3 in FIG. 1.

FIGS. 1–20 show a portion of meter register of the type used in utility meters to record consumption of units of gas, electricity and water. Not shown is a main portion of the meter in which a mechanical mover, such as a water turbine, for example, is moved by the flow of fluid. This mechanical mover is coupled to the present meter register through a gear drive which drives an assembly 10 of the present invention having six number wheels 13, 14, 15, 16, 17 and 18.

To distinguish the parts in the various embodiments, the suffix "a" shall be used in numbering FIGS. 1–4, the suffix "b" shall be used in FIGS. 5–8, the suffix "c" shall be used in FIGS. 9–12, the suffix "d" shall be used in FIGS. 13–16 and suffix "e" shall be used in FIGS. 16–20. Where the numbers appear in the description without a suffix, they shall refer to the corresponding parts with suffixes "a" through "e" in the five respective embodiments.

The meter register has a face with a window for viewing the portions of the number wheels 13–18 representing the count at any given time. In the five preferred embodiments, the counter is a decade counter. Each number wheel moves ten times to complete one full revolution and cause a next higher order number wheel to move 1/10 revolution. It should be apparent that although the preferred embodiment is a decade counter, other counters such as octal, could be constructed within the teaching of the invention.

The number wheel assembly 10 has shaft 32a with ends 20a, 21a (FIG. 1) which extend from the ends of the number wheel assembly 10. A plurality of pins 22a are formed on the lowest order number wheel 18a, for driving the wheel 18a. Teeth 23a are formed around one edge of wheels 13a–17a to be driven by gears in the mechanical portion of the meter register unit.

Figure 2:
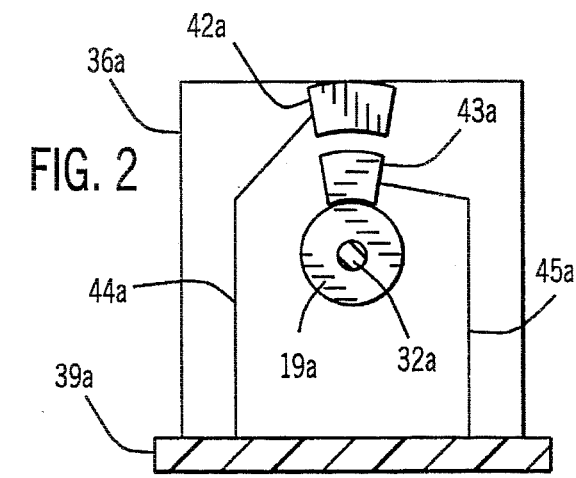
FIG. 2 is a sectional view taken in the plane indicated by line 2—2 in FIG. 1.
Figure 17:
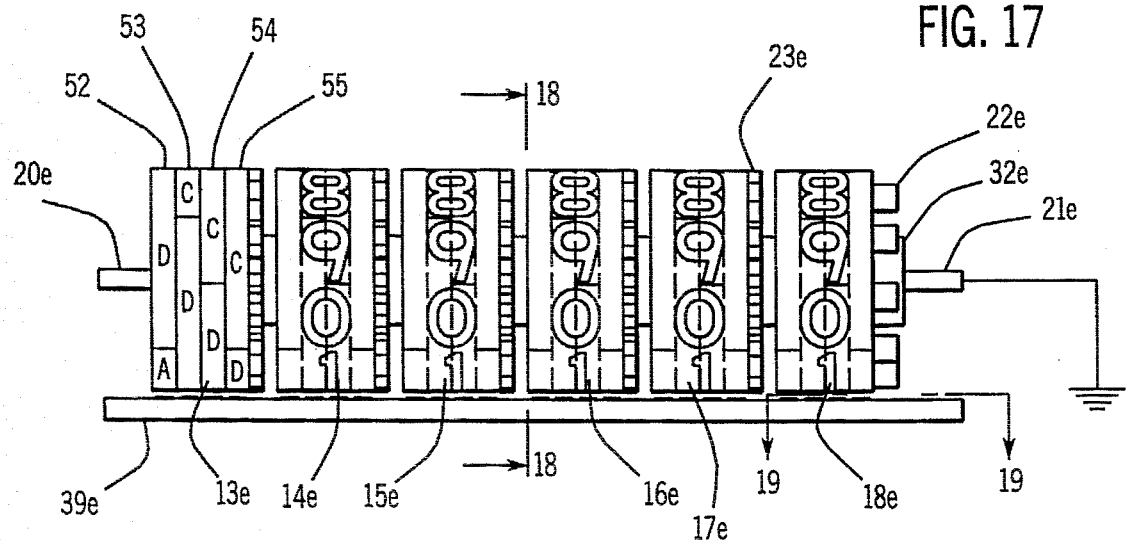
FIG. 17 is a side view in elevation of a fifth embodiment of the invention.

FIGS. 1 and 5 show upright substrates that are supported by a motherboard PCB (printed circuit board) 39a, 39b. In FIGS. 9, 13 and 17, substrates are not necessary. FIG. 2 shows conductive electrodes 42a, 43a on a side of substrate 36a facing the number wheel 16a. A position electrode 42a and a reference electrode 43a are connected by printed circuit paths 44a, 45a to the motherboard 39a. These electrodes 42a, 43a form one plate of a variable capacitor and one plate of a reference capacitor, respectively. The reference electrode 43a faces a portion of the hub 29a to form the reference capacitor having a fixed air gap.

Figure 4:
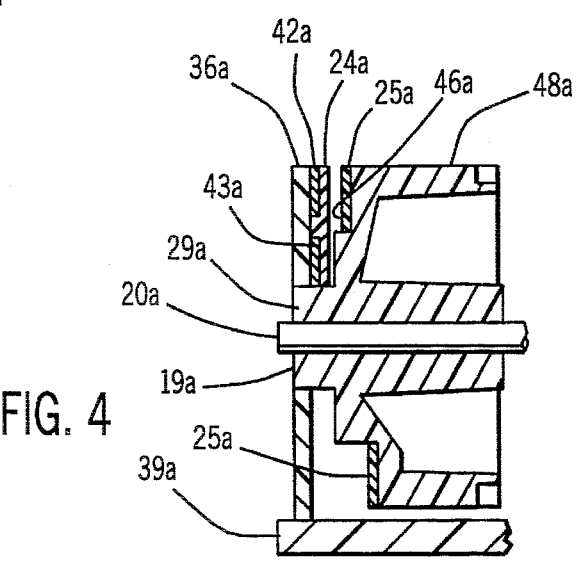
FIG. 4 is a sectional view taken in the plane indicated by line 4—4 in FIG. 3.

Each number wheel 13a–18a has an thin annular element 46a of dielectric material at a radial distance from an axis of rotation 47a passing between pins 20a, 21a. The annular surface 46a of each wheel extends along a spiral path around an axis of rotation 47a. This provides an air gap between electrodes 42a and dielectric surface 46a which varies as a number wheel 13a–18a, such as number wheel 16a in FIG. 4, is rotated.

The electrodes 42a, 43a and the annular surface 46a are provided with a coating of a spray-on urethane material, such as Humi-Seal™ available from Columbia Products, to protect against moisture accumulating on these surfaces 42a, 43a, 46a.

The dielectric elements 46a of the number wheels 13a–18a are grounded through shaft end 21a.

Each number wheel has ten positions corresponding to areas on circumference of wheel which carry digits from "0" to "9". The digits are printed or applied as decals to Mylar sleeve 48a disposed on a circumference of each number wheel 13a–18a.

In operation, the variable capacitance is detected parallel to axis of rotation 47a between active electrode 42a and grounded dielectric element 46a. The reference capacitance is detected parallel to axis of rotation 47a between reference electrode 43a and the hub 29a. The variable capacitance and fixed capacitance are then compared for each wheel to determine the position of each number wheel, and thus a total count.

FIGS. 5–8 show an embodiment similar to FIGS. 1–4, with "b" numbered parts corresponding to similarly numbered "a" parts in FIGS. 1–4, except that the dielectric element 46b is subdivided into two portions 49b and 50b with different dielectric values per unit thickness.

The boundary 51b between first dielectric material 49b and second dielectric material 50b spirals around axis 47b to vary thickness of first dielectric material 49b and second dielectric material 50b at various positions around the number wheels 13b–18b.

The electrodes 42b, 43b and the annular surface 46a are provided with a coating of a spray-on urethane material, such as Humi-Seal™ available from Columbia Products, to protect against moisture accumulating on these surfaces 42b, 43b, 46b.

The number wheels 13b–18b each have ten positions corresponding to areas on circumference of wheel which carry digits from "0" to "9". The digits are printed or applied as decals to Mylar sleeve 48b disposed on circumference of number wheel.

The variable capacitance is detected in a circuit which parallels the axis of rotation 47b between active electrode 42b and dielectrics 49b and 50b.

The reference capacitance is detected in a circuit which parallels the axis of rotation 47b between reference electrode 43b and a reference hub, such as reference hub 29b, seen in FIG. 7.

The variable capacitance and fixed capacitance are then compared for each wheel 13b–18b to determine the position of each number wheel, and thus a total count.

FIGS. 9–12 show an embodiment in which the reference capacitance and the variable capacitance are formed in a radial direction relative to the number wheels 13c–18c. Again parts numbered with a "c" and a two-digit number found in FIGS. 1–8 correspond to similarly numbered "a" and "b" parts in FIGS. 1–8. Note, however, that there are no upright substrates 26–31 in FIGS. 9–12, only motherboard PCB 39c. The shaft end 21c is grounded as in the previous embodiments.

The position and reference electrodes 42c, 43c are now positioned on the motherboard PCB 39c facing circumferential surfaces of the number wheels 13c–18c (FIG. 11). The printed circuit paths shown in the previous embodiments for electrodes 42, 43, are now internal to the motherboard 39c.

Each number wheel 13c–18c has a circumferential element with a first portion 29c of a thickness that varies in a radial direction from axis of rotation 47c (FIG. 10). The axial thickness of the first portion 29c is less than full width of wheel 13c–18c (FIGS. 9 and 12). Each number wheel 13c–18c includes a second portion 51c positioned next to the first portion 29c to form reference capacitor (FIG. 9).

Digits "0" to "9" are printed or applied as decals to a Mylar sleeve 48c disposed on circumference of number wheel over conductive material 51c and dielectric material 46c.

A variable capacitance is detected in a radial direction between first motherboard electrode 42c and the first portion 46c (FIG. 10) of dielectric material in a radial direction relative to axis of rotation 47c (FIG. 9). A reference capacitance is detected between reference electrode 43c through conductive material 51c and ground plane in radial direction relative to the axis of rotation 47c (FIG. 9).

The variable capacitance and fixed capacitance are then compared for each wheel 13c–18c to determine the position of each number wheel, and thus a total count.

FIGS. 13–16 show an embodiment similar to FIGS. 9–12, except that a second dielectric element 46d (FIG. 13) is disposed over the first radial portion 29d and varies inversely in thickness to the first dielectric element 29d in the radial direction from axis of rotation 47d. The axial thickness of dielectric elements 46d and 51d is less than full width of each wheel 13d–18d (FIG. 12).

A variable capacitance is detected between first motherboard electrode 42d through dielectrics 46d and 49d to in a radial direction relative to shaft 32d (FIG. 12).

A reference capacitance is detected between reference electrode 43d through material 51d in a radial direction relative to axis of rotation 47d (FIG. 12).

The variable capacitance and fixed capacitance are then compared for each wheel 13c–18c to determine the position of each number wheel, and thus a total count.

FIGS. 16–19 illustrate an number wheel assembly using variable capacitance to generate analog-coded decimal signals. The number wheels 13e–18e are carried by carrier assembly 40e having shaft 32e with shaft ends 20e and 21e extending from opposite ends of the assembly along an axis of rotation 47e for the number wheels 13e–18e. Each number wheel 13e–18e has four circumferential tracks 52, 53, 54 and 55 (exemplified by track 52 in FIG. 17) each with four arcuate segments A, B, C and D of respective dielectric materials. Each track has segment A staggered with respect to the position of segment A of the next track in the pattern shown in FIGS. 17 and 20. The resulting Table 1 is the following arrangement of the segments relative to ten rotational positions of each number wheel 13e–18e.

TABLE 1

| Position | Track 52 | Track 53 | Track 54 | Track 55 |
| --- | --- | --- | --- | --- |
| 1 | A | D | D | D |
| 2 | A | A | D | D |
| 3 | B | A | A | D |
| 4 | B | B | A | A |
| 5 | C | B | B | A |
| 6 | C | C | B | B |
| 7 | C | C | C | B |
| 8 | D | C | C | C |
| 9 | D | D | C | C |
| 0 | D | D | D | C |

On the motherboard 39e, aligned and facing tracks 52–55 are conductive electrodes 42e, 42f, 42g, 42h.

Digits "0" to "9" are printed or applied as decals to Mylar sleeve disposed on circumference of number wheels 13e–18e.

Figure 19:
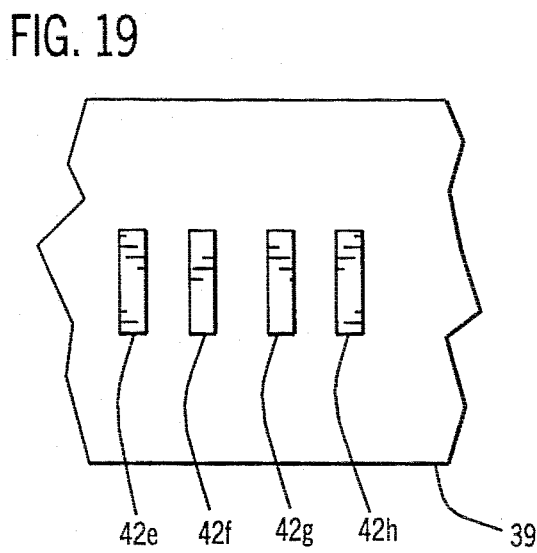
FIG. 19 is a sectional view taken in the plane indicated by line 19—19 in FIG. 17.
Figure 20:
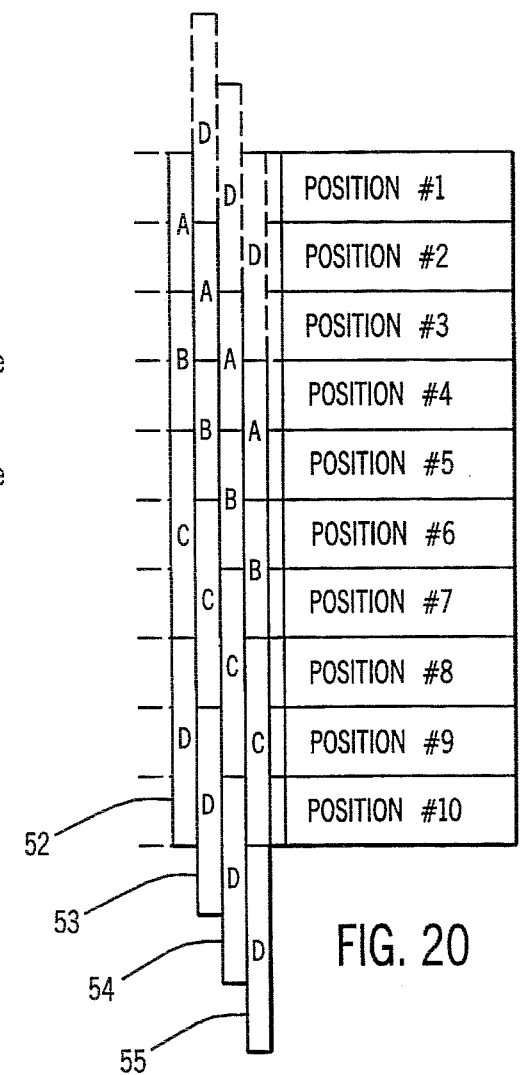
FIG. 20 is a schematic view of the ten rotational positions of the number wheels of FIG. 17.

A set of four analog-coded variable capacitances are detected between tracks 52, 53, 54 and 55 and respective electrodes 42e, 42f, 42g, 42h (FIG. 19). The pattern is then decoded in a manner known in the art by conventional circuitry on motherboard 39e.

Figure 21:
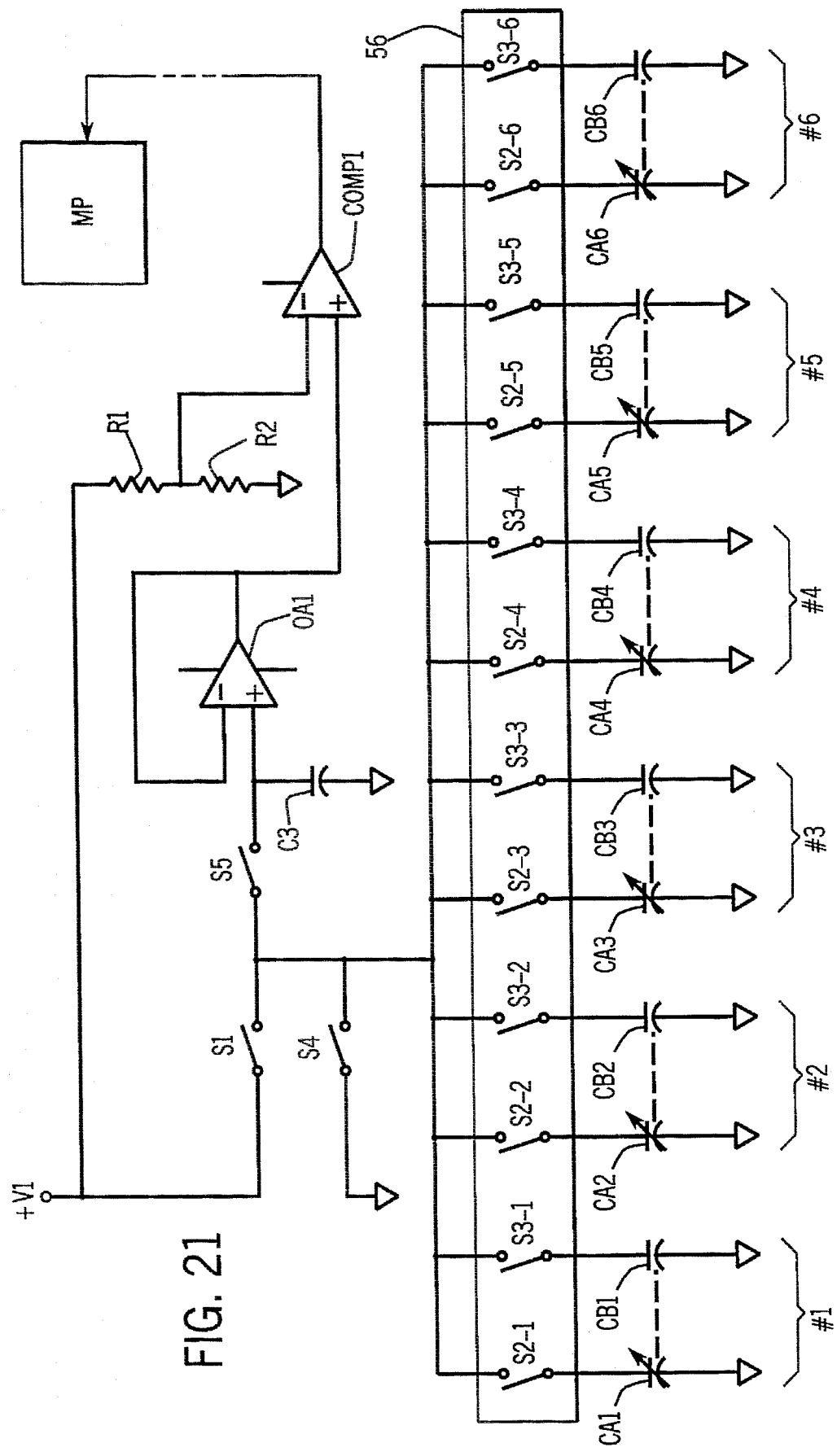
FIG. 21 is an electrical schematic view of a detection circuit which connects to the first through fifth embodiments.

FIG. 21 illustrates detection circuitry on motherboard for reading the capacitances produced by the position of the number wheels 13–18 in the four embodiments shown in FIGS. 1–16. The variable capacitances produced by the four embodiments in FIGS. 1–14 for number wheels 13–18 are represented by capacitors CA1, CA2, CA3, CA4, CA5 and CA6 in FIG. 21. The reference capacitances produced by the four embodiments in FIGS. 1–14 for number wheels 13–18 are represented by capacitors CB1, CB2, CB3, CB4, CB5 and CB6 in FIG. 18. The ground connections in FIG. 18 are provided by the ground planes in FIG. 4 and FIG. 8 for the first two embodiments and are formed on the motherboard 39c, 39d for the third and fourth embodiments in FIGS. 9–14.

Figure 18:
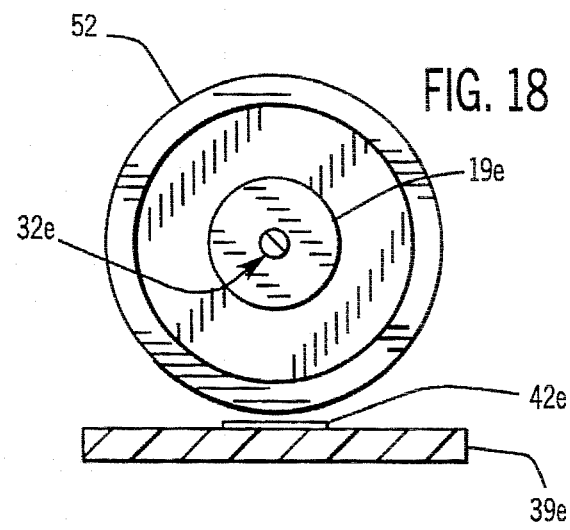
FIG. 18 is a sectional view taken in the plane indicated by line 18—18 in FIG. 17.

In FIG. 18, the switches S2-1 through S2-6 and switches S3-1 through S3-6 are formed by a multiplexer 56 which is provided by a commercial circuits such as the Maxim DG 406 multiplexer circuits. Switches S1, S4 and S5 are provided by a commercial circuit such as the Maxim DG 442 analog switching circuits.

A source of positive DC voltage is connected through switches S1 and S5 to an noninverting (+) input of an operational amplifier OA1, which is provided by an ICL 7614 circuit available from Maxim. The output of this op amp OA1 is connected back to the inverting (−) input. A holding capacitor C3 is connected between the noninverting (+) input and ground. The output of the op amp OA1 is also connected to a noninverting (+) input of a comparator provided by a commercial circuit Max 922 available from Maxim. The source of positive DC voltage (+V) is also connected through voltage divider provided by resistors R1 and R2 to the inverting (−) input of the comparator circuit COMP1. The output of the comparator circuit COMP1 is connected to an input on a microelectronic processor MP, such as the 68HC05 available from Motorola. The microelectronic processor MP also has outputs connected to control the switching of the switches S2-1 through S2-6, S3-1 through S3-6 and switches S1, S2 and S4 mentioned previously.

As a preparatory step, switches S4 and S5 are closed, along with the appropriate switch S2-1 through S2-6 to discharge a selected position capacitor CA2 through CA6 and to discharge holding capacitor C3. Then, in a first detection step, with switches S4 and S5 open, the position capacitor CA1–CA6 is charged by closing switch S1 and the appropriate switch S2-1 through S2-6. In a second detection step, with switches S1 and S4 open, switch S5 is closed, together with the appropriate switch S2-1 through S2-6, to transfer the accumulated charge to the holding capacitor C3. The first and second detection steps are then repeated to incrementally increase the charge on the holding capacitor C3 until the output of the comparator COMP1 goes to a logic high state. The microelectronic processor MP counts and stores the number of transfer cycles needed to switch the comparator COMP1 in this manner. The microelectronic processor MP then determines the capacitance of the variable capacitance provided by the selected number wheel 13–18. The preparatory and detection steps are then repeated to determine the capacitance of the reference capacitor CB1–CB5 provided by the selected number wheel 13–18. The method is repeated for each of the number wheels 13–18. The microelectronic processor MP determines the difference between the variable capacitance and reference capacitance for each number wheel 13–18 to determine the positions of the respective number wheels 13–18 and the accumulated decimal count. This count may be communicated to a human observer through one of the many digital display devices known in the art.

This has been a description of examples of how the invention can be carried out. Those of ordinary skill in the art will recognize that various details may be modified in arriving at other detailed embodiments, and these embodiments will come within the scope of the invention.

For example, although shafts 32a–e are shown and described for supporting the number wheels for rotations, various other means including hub assemblies are also contemplated by the invention, so as the number wheels are supported for rotation around an axis of rotation.

Therefore, to apprise the public of the scope of the invention and the embodiments covered by the invention, the following claims are made.

We claim:

1. A capacitive device for providing an electrical signal to a detector circuit to indicate one of a plurality of positions of a movable element to represent a count, wherein at least one movable element comprises a rotatable element having a circumference with a plurality of positions representing successive increments in a count that is greater than a binary count, and the device further comprising:

a substrate opposite one surface of the rotatable element, the substrate carrying a stationary electrode that is spaced from the rotatable element to form a gap for a variable capacitor; and means supporting the rotatable element for rotation of the rotatable element around an axis of rotation; and further comprising dielectric material extending around the circumference of the rotatable element, said dielectric material having variable thickness to produce variable spacing across the gap from the stationary electrode to form a plurality of capacitance values at the plurality of positions around the circumference of the rotatable element, wherein said plurality of capacitance values correspond to a count greater than a binary count.

2. The device of claim 1, wherein a sealing coating is provided on the electrode and the dielectric material for protection against moisture.

3. The device of claim 1, wherein the rotatable element is a number wheel with indicia around the circumference of the number wheel corresponding to the plurality of positions.

4. The device of claim 1, wherein the capacitance is varied by varying the spacing of the dielectric material from the stationary electrode on the substrate in a direction substantially parallel to the axis of rotation of the rotatable element.

5. The device of claim 4, wherein a sealing coating is provided on the electrode and the dielectric material for protection against moisture.

6. The device of claim 4, wherein the rotatable element is a number wheel.

7. The device of claim 1, wherein a sealing coating is provided on the electrode and the dielectric material for protection against moisture.

8. The device of claim 1, wherein the rotatable element is a number wheel.

9. The device of claim 1, wherein the thickness of the dielectric material is varied in a direction along a radius from the axis of rotation of the rotatable element.

10. The device of claim 9, wherein the rotatable element is a number wheel.

11. The device of claim 1, wherein the thickness of the dielectric material is varied in a direction parallel to the axis of rotation of the rotatable element.

12. The device of claim 11, wherein a sealing coating is provided on the electrode and the dielectric material for protection against moisture.

13. The device of claim 11, wherein the rotatable element is a number wheel.

14. The device of claim 1, wherein the rotatable element carries a second dielectric material around the circumference of said rotatable element and disposed adjacent said first-mentioned dielectric material and varying inversely in thickness to said first-mentioned dielectric material.

15. The device of claim 14, wherein thicknesses of the first and second dielectric materials are varied in a direction along a radius from the axis of rotation of the rotatable element.

16. The device of claim 14, wherein thicknesses of the first and second dielectric materials are varied in a direction parallel to the axis of rotation of the rotatable element.

17. The device of claim 16, wherein a sealing coating is provided on the electrode and the dielectric element for protection against moisture.

18. The device of claim 16, wherein the rotatable element is a number wheel.

19. The device of claim 1, wherein the rotatable element carries a plurality of tracks around its circumference each having a plurality of dielectric materials to vary the capacitance of the variable capacitor as the rotatable element is rotated relative to the electrode on the substrate.

* * * * *